United States Patent
Szita (10) Patent No.: US 8,054,574 B2
(45) Date of Patent: Nov. 8, 2011

(54) METHOD OF MEASURING NON-COHERENT RUNOUT FOR A DISK DRIVE

(75) Inventor: Gabor Szita, Newark, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 36 days.

(21) Appl. No.: 12/475,360

(22) Filed: May 29, 2009

(65) Prior Publication Data

US 2010/0302663 A1 Dec. 2, 2010

(51) Int. Cl.
G11B 5/596 (2006.01)
(52) U.S. Cl. .................. 360/77.04; 360/77.08
(58) Field of Classification Search .......... None
See application file for complete search history.

(56) References Cited

U.S. PATENT DOCUMENTS

| | | | |
|---|---|---|---|
| 6,654,198 B2 | 11/2003 | Lin et al. | |
| 6,898,047 B2 | 5/2005 | Shishida et al. | |
| 6,963,466 B2 | 11/2005 | Baum et al. | |
| 6,975,480 B1 | 12/2005 | Codilian et al. | |
| 2003/0112545 A1 * | 6/2003 | Hanson et al. | 360/77.04 |
| 2003/0112546 A1 | 6/2003 | Hansen et al. | |
| 2007/0297088 A1 * | 12/2007 | Sun et al. | 360/77.04 |

* cited by examiner

*Primary Examiner* — Andrew L Sniezek
(74) *Attorney, Agent, or Firm* — Patterson & Sheridan, LLP

(57) ABSTRACT

In a disk drive, a modified adaptive runout compensation algorithm is employed to measure non-coherent repeatable runout (RRO) of a track. The adaptive runout compensation algorithm is used to control the transducer head to follow the average RRO of adjacent tracks during the process of computing correction factors for non-coherent RRO for a given track. The adaptive runout compensation algorithm does not completely adapt to both the coherent and non-coherent RRO of a particular track because the transducer head is positioned over any one particular track for only a limited number of revolutions.

1 Claim, 6 Drawing Sheets

METHOD OF MEASURING NON-COHERENT RUNOUT FOR A DISK DRIVE

BACKGROUND OF THE INVENTION

1. Field of the Invention

Embodiments of the present invention relate generally to disk drives and, more particularly, to a method of measuring non-coherent runout for such drives.

2. Description of the Related Art

A disk drive is a data storage device that stores digital data in tracks on the surface of a data storage disk. Data is read from or written to a track of the disk using a transducer, which includes a read element and a write element, that is held close to the track while the disk spins about its center at a substantially constant angular velocity. To properly locate the transducer near the desired track during a read or write operation, a closed-loop servo system is generally implemented. The servo system uses servo data read from a "servo wedge" on the disk surface to align the transducer with the desired track, where the servo data may include the track number as well as "servo bursts" that indicate how far the recording head is from the ideal track center line. The servo data are previously written on the disk surface by the drive itself using a self-servo-writing procedure or by an external device, such as a servo track writer (STW). In either case, an additional factory calibration for each track present on the disk drive may be required to compensate for small errors in the position of the servo bursts written on the disk surface. Because modern disk drives typically include hundreds of thousands of tracks, such factory calibration is a time-consuming part of the manufacturing process.

In an ideal disk drive, the tracks of a disk are non-perturbed circles situated about the center of the disk. As such, each ideal track includes a track centerline that is located at a known constant radius from the disk center. In practice, however, writing non-perturbed circular tracks to a disk is problematic due to imperfections in the media itself and/or in the position control of the device writing the servo bursts caused by mechanical effects, e.g., vibration, bearing defects, inaccuracies in the STW, disk clamp slippage, etc. Thus, the servo bursts that define each track are generally written with an offset from the ideal non-perturbed circular track shape. Positioning errors created by the offset between the real servo burst locations and the ideal track location are known as repeatable runout (RRO).

RRO can be divided into two components: coherent and non-coherent. The coherent portion of RRO is the portion that is approximately the same in a group of adjacent tracks and changes slowly across the disk surface. Coherent RRO is typically caused by disk eccentricity, clamping distortions, and other factors that alter the shape of relatively large portions of the disk, thereby producing irregularities in the placement of servo bursts from ideal circular tracks that are substantially similar for adjacent tracks. Coherent RRO can be large with respect to track width, for example on the order of multiple track widths. The non-coherent portion of RRO is generally much smaller than the coherent portion, is different for each track, and is due to imperfections in the media magnetic layer or in the position control of the transducer while writing the servo bursts.

Without additional correction to the servo bursts as written to a disk, the non-ideal shape of the tracks as defined by the servo bursts creates two problems. First, the transducer positioning function is made more complicated during read and write operations because the servo system needs to continuously reposition the transducer during track following to keep up with the rapidly changing radius of the track centerline as defined by the non-coherent RRO of the servo bursts, rather than following the more smoothly changing radius of the coherent RRO perturbations. Second, the perturbed shape of these tracks due to non-coherent RRO can result in problems such as track misregistration errors during read and write operations and "track squeeze," i.e., adjacent tracks that are spaced too close together.

Disk drive manufacturers have developed different techniques to compensate for coherent and non-coherent RRO. Typically, coherent RRO is compensated by injecting appropriate signals into the disk drives actuator that results in the head accurately following the coherent RRO. On the other hand, non-coherent RRO is often compensated by adding correction factors (sometimes called wedge offset compensation values) to the measured head position such that the head does not follow the non-coherent RRO. In one typical embodiment these wedge offset compensation values are computed during the post-manufacturing test process and written on the disk surface. Because it is typically undesirable for these techniques to correct for the coherent portion of RRO, disk drive manufacturers have developed techniques to separate the coherent and non-coherent RRO for each track of a disk drive. However, techniques known in the art for separating coherent and non-coherent RRO require substantial computation time and/or memory. For example, prior to calculating compensation values for non-coherent RRO, coherent RRO can be estimated for a plurality of zones on a disk surface by measuring the average RRO for multiple tracks in each zone, which can be a time-consuming procedure. Alternatively, coherent RRO can be determined while computing non-coherent RRO for a given track on the fly by storing the total RRO of recently measured tracks, e.g., the previous 100 tracks, computing coherent RRO based on the average RRO of these tracks, and defining non-coherent RRO as the total RRO minus the average RRO. Such a procedure requires significant additional computational resources and data storage to calculate the compensation values for non-coherent RRO.

In light of the above, there is a need in the art for an improved method of measuring non-coherent RRO for a disk drive when calculating wedge offset compensation values.

SUMMARY OF THE INVENTION

One or more embodiments of the invention provide a method and a system for measuring non-coherent repeatable runout (RRO) for each track of a disk drive. The embodiments employ a modified version of an adaptive runout compensation algorithm that positions the drive transducer head to follow the average RRO of adjacent tracks during the process of computing correction factors for non-coherent RRO for a given track. The adaptive runout compensation algorithm is an algorithm already used by the drive during normal operation, but is modified such that adaptation to the RRO of a given track is enabled for only a limited number of revolutions for each track, e.g., one or two. When so modified, the adaptive runout compensation algorithm cannot completely adapt to the RRO of the current track during the process of computing non-coherent RRO correction factors for that track. Instead, the algorithm will only adapt to the average RRO of tracks, i.e., the algorithm makes the transducer head to follow the coherent RRO for the track while the drive is computing non-coherent RRO correction factors (wedge offset compensation values) for the track. In this way, non-coherent RRO is measured directly with respect to the coherent RRO, thereby eliminating the need for additional mathematical computations to separate the coherent and non-coherent RRO.

A method for determining non-coherent runout of each track in a group of adjacent tracks of a disk drive recording medium, according to an embodiment of the invention, includes the steps of (1) positioning a transducer head over a track in the group, (2) maintaining the transducer head over the track and allowing an adaptive runout compensation algorithm to adapt to a coherent runout of the track, (3) determining a non-coherent runout of the track before the adaptive runout compensation algorithm adapts to the non-coherent runout of the track, and (4) positioning the transducer head over an adjacent track in the group and repeating steps (2) and (3) for the adjacent track.

A method for determining correction factors used in generating a servo control signal for a disk drive transducer head, according to an embodiment of the invention, includes the steps of successively positioning the transducer head over one or more tracks of the disk drive recording medium and, for each track position, allowing an adaptive runout compensation algorithm to adapt to a runout of the track for a number of revolutions of the recording medium, stepping the transducer head to be moved over one track and allowing the adaptive runout compensation algorithm to adapt to a runout of the new track for one or two revolutions of the recording medium, and determining the correction factors after the one or two revolutions of the recording medium.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
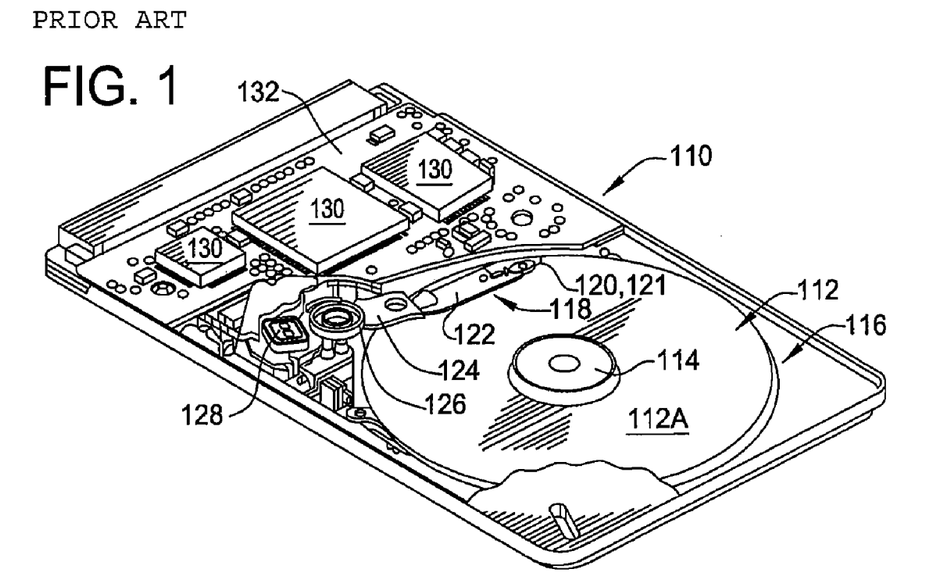
FIG. 1 is a perspective view of a disk drive that can benefit from embodiments of the invention as described herein.

FIG. 1 is a perspective view of a disk drive 110 that can benefit from embodiments of the invention as described herein. For clarity, disk drive 110 is illustrated without a top cover. Disk drive 110 includes a storage disk 112 that is rotated by a spindle motor 114. Spindle motor 114 is mounted on a base plate 116. An actuator arm assembly 118 is also mounted on base plate 116, and has a slider 120 mounted on a flexure arm 122 and includes a transducer head 121 lithographically constructed thereon. Flexure arm 122 is attached to an actuator arm 124 that rotates about a bearing assembly 126. Voice coil motor 128 moves slider 120 relative to storage disk 112, thereby positioning transducer head 121 over the desired concentric data storage track disposed on the surface 112A of storage disk 112. Spindle motor 114, transducer head 121, and voice coil motor 128 are coupled to electronic circuits 130, which are mounted on a printed circuit board 132. The electronic circuits 130 include a read channel, a microprocessor-based controller, and random access memory (RAM). For clarity of description, disk drive 110 is illustrated with a single storage disk 112 and actuator arm assembly 118. Disk drive 110, however, may also include multiple storage disks 112 and multiple actuator arm assemblies 118. In addition, each side of storage disk 112 may have an associated transducer head 121, both of which are collectively coupled to the rotary actuator 130 such that both transducer heads 121 pivot in unison. The invention described herein is equally applicable to devices wherein the individual heads are configured to move separately some small distance relative to the actuator. This technology is referred to as dual-stage actuation (DSA).

Figure 2A:
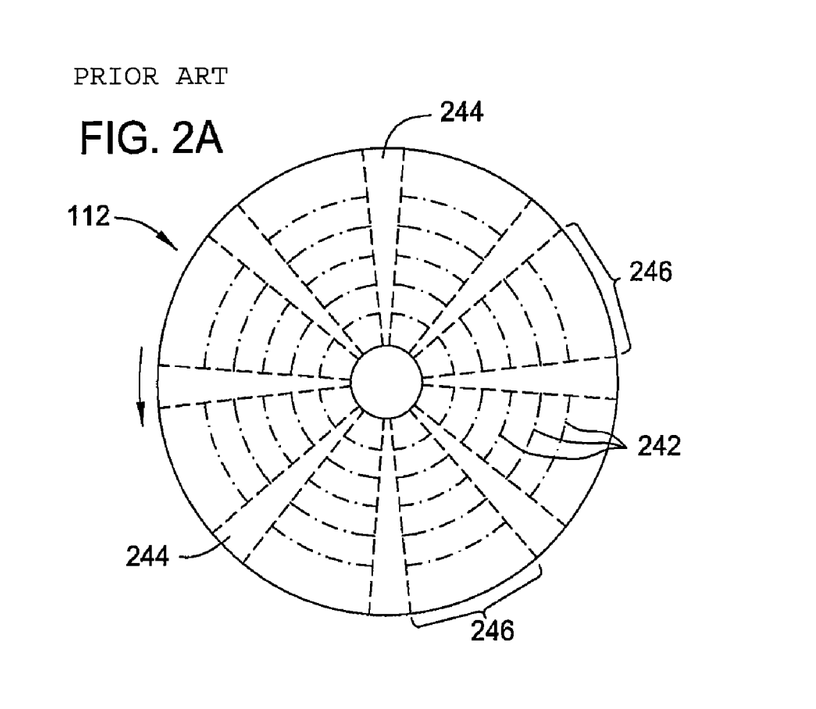
FIG. 2A illustrates storage disk with data organized in a typical manner known in the art.

FIG. 2A illustrates storage disk 112 with data organized in a typical manner known in the art. Storage disk 112 includes concentric data storage tracks 242 for storing data. Each of concentric data storage tracks 242 is schematically illustrated as a centerline. However, it should be understood that each of concentric data storage tracks 242 occupies a finite width about a corresponding centerline. Storage disk 112 includes substantially radially aligned servo wedges 244, also referred to as servo spokes, that cross concentric data storage tracks 242 and store servo information in servo sectors in concentric data storage tracks 242. Such servo information includes a reference signal, such as a square wave of known amplitude, that is read by transducer head 121 during read and write operations to position the transducer head 121 above a desired track 242. The servo information in servo wedges 244 is further detailed below in conjunction with FIG. 2B. In practice servo wedges 244 may be somewhat curved, for example, configured in a partial spiral pattern. Typically, the actual number of concentric data storage tracks 242 and servo spokes 244 included on storage disk 112 is considerably larger than illustrated in FIG. 2A.

In operation, actuator arm assembly 118 sweeps an arc between an inner diameter (ID) and an outer diameter (OD) of storage disk 112. Actuator arm assembly 118 accelerates in one angular direction when current is passed through the voice coil of voice coil motor 128 and accelerates in an opposite direction when the current is reversed, allowing for control of the position of actuator arm assembly 118 and the attached transducer head 121 with respect to storage disk 112. Voice coil motor 128 is coupled with a servo system 400 (shown in FIG. 4) that uses positioning data read by transducer head 121 from storage disk 112 to determine the position of transducer head 121 over concentric data storage tracks 242. Servo system 400 determines an appropriate current to drive through the voice coil of voice coil motor 128, and drives said current using a current driver and associated circuitry (shown in FIG. 4).

Figure 2B:
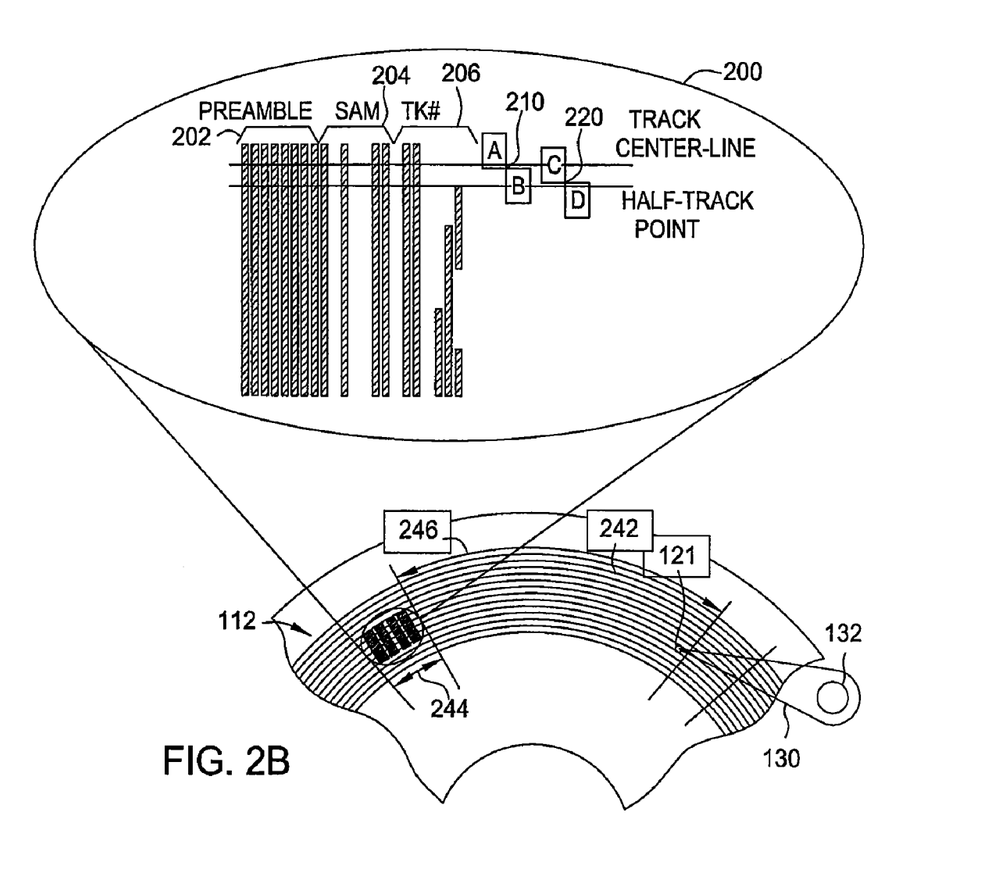
FIG. 2B schematically illustrates a portion of a storage disk having at least one servo wedge.

FIG. 2B schematically illustrates a portion of storage disk 112 having at least one servo wedge 244. Each servo wedge 244 includes information stored as regions of magnetization or other indicia, such as optical indicia. Servo wedge 244 may be longitudinally magnetized (I.e., the cross-hatched blocks of servo pattern 200 are magnetized to the left and white spaces of servo pattern 200 are magnetized to the right, or vice-versa) or perpendicularly magnetized (i.e., the cross-hatched blocks are magnetized out of the page and the white spaces are magnetized into the page, or vice-versa). Servo pattern 200 contained in each servo wedge 244 is read by transducer head 121 as the surface of the storage disk 112 passes under transducer head 121. The servo patterns 200 may include information used to identify a data sector contained in a data field 246. For example, servo pattern 200 may include digital information such as a preamble 202, a servo address mark (SAM) 204, and a track identification number 206. The servo pattern 200 also includes a set of servo bursts A, B, C, and D. As shown, there is a servo burst edge 210 between the A burst and the B burst, and a servo burst edge 220 between the C burst and the D burst. The pattern illustrated in FIG. 2B is a quadrature type pattern. In some embodiments, the servo wedge 244 may also include other information such as a wedge number. This can be a single bit to designate an index wedge (wedge #0), or the SAM may be replaced by another pattern (referred to as a servo index mark or SIM), or the wedge may contain a few low-order bits of the wedge number or a complete wedge number. Alternatively, servo pattern 200 may include different servo burst patterns known in the art other than the pattern illustrated in FIG. 2B.

In an ideal drive, one of the burst edges may be located at the center of a track or at a known distance from the center of the track. The servo pattern is read and demodulated and the distance of transducer head 121 from a selected servo burst edge is determined. A position error signal (PES) indicative of the distance from the track center or the servo burst edge is generated and used to move transducer head 121 to a position over the center of the desired track. In practice, however, the write head of the device writing the servo bursts, i.e., a servo writer, a media writer or the disk drive itself, cannot be positioned perfectly, and the servo bursts placed on the disk generally do not exactly correspond to the ideal track location. Thus, there may be a significant offset between the desired position of the servo bursts and the actual position of the servo bursts written on storage disk 112, resulting in repeatable runout (RRO). RRO can be thought of as the offset between the ideal centerline of a track and the centerline that would be determined by a transducer head reading the written servo pattern. As noted previously, RRO can lead to servo performance problems, wasted space on a disk and, in a worst case, unrecoverable or irreparably damaged data.

Figure 3:
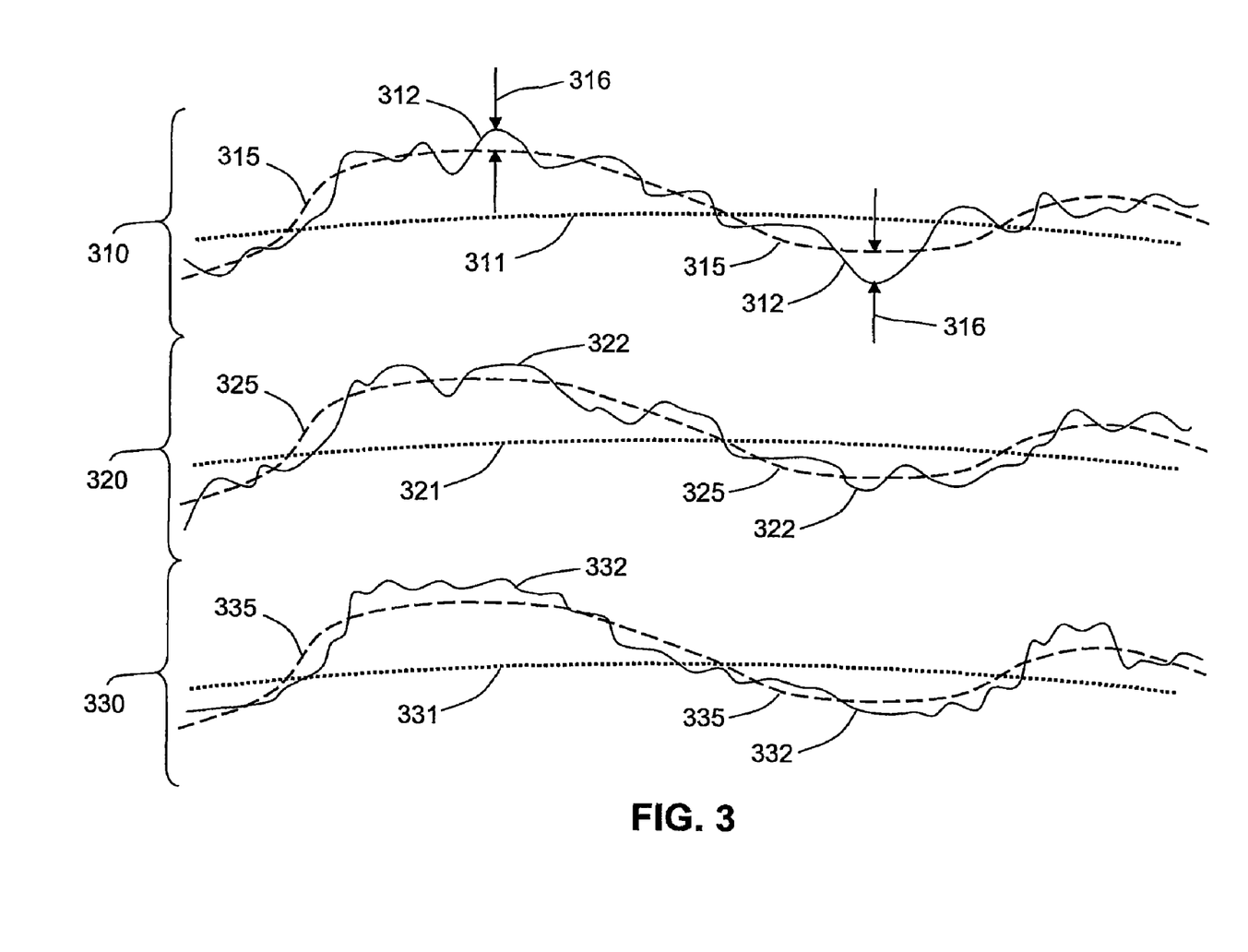
FIG. 3 schematically illustrates a region of a storage disk, which includes portions of multiple tracks.

FIG. 3 schematically illustrates a region 300 of storage disk 112, which includes portions of tracks 310, 320, and 330. Tracks 310, 320, and 330 are three adjacent concentric data storage tracks 242 found on storage disk 112. Tracks 310, 320, and 330 each have an ideal track centerline 311, 321, 331, respectively, associated therewith. Ideal track centerlines 311, 321, 331 are the ideal centerlines of tracks 310, 320, and 330 that define said tracks to be perfect circles, concentrically positioned, and equidistant from each other. In addition, tracks 310, 320, and 330 each include an actual track centerline 312, 322, 332, respectively. Actual track centerlines 312, 322, 332 represent the centerlines of tracks 310, 320, and 330, respectively, as defined by the actual written locations of the servo bursts for each track. Also illustrated in FIG. 3 are coherent RRO tracks 315, 325, and 335, which are associated with tracks 310, 320, and 330, respectively. Coherent track 315, 325, and 335 represent the portion of the RRO of actual track centerlines 312, 322, 332, respectively, that corresponds to coherent RRO. As shown, each of actual track centerlines 312, 322, 332 can vary randomly with respect to each other, since the path of each is altered by small defects in the disk media and/or random perturbations of the writing head as the servo bursts are written to the disk. In contrast, each of coherent tracks 315, 325, 335 are substantially similar to each other.

In operation, servo system 400 (described below in FIG. 4) controls the position of transducer head 121 relative to a particular concentric data storage track 242 so that transducer head 121 follows the coherent RRO of the track instead of the ideal track centerline. For example, rather than using wedge offset correction values or other means to position transducer head 121 over ideal track centerline 311 for reading and/or writing operations, servo system 400 positions transducer head 121 to follow coherent RRO track 315. The path of coherent track 315 can slowly change across the disk surface, or it can change over time due to large-scale distortion of storage disk 112, e.g., due to temperature change, disk clamp slippage, etc. Therefore, servo system 400 uses an adaptive runout compensation algorithm to follow coherent RRO track 315 with transducer head 121. Adaptive runout compensation algorithms are known in the art and are commonly used during normal operation of disk drives. Such algorithms may use discrete Fourier transform (DFT), digital filters, or a table-based feed-forward scheme to better enable servo system 400 to follow coherent RRO track 315 (and all other coherent RRO tracks) as coherent RRO track 315 changes with time. In normal operation of disk drives, such algorithms are designed to slowly adapt to changes in RRO, for example on the order of 3-50 revolutions of storage disk 112.

As shown, actual track centerline 312 is offset from coherent RRO track 315 by displacement 316. Displacement 316 reflects the contribution of non-coherent RRO to actual track centerline 312 at a given servo wedge. So that servo system 400 substantially ignores irregularities in servo burst position associated with non-coherent RRO, i.e., displacement 316, correction factors for each servo burst are computed during the post-manufacturing self-test process. Such correction factors, referred to herein as wedge offset reduction field (WORF) values or WORF data, are based on displacement 316 at each servo wedge, where displacement 316 is the offset between the coherent RRO track centerline, e.g., coherent RRO track 315, and the actual centerline obtained from demodulating the burst pattern, e.g., actual track centerline 312. In order to determine the value of displacement 316 for each servo burst on a given track, the coherent RRO and non-coherent RRO must be separated. Embodiments of the invention contemplate a computationally efficient means of separating the coherent and non-coherent RRO of actual track centerline 312 so that WORF values can be calculated. A method of separating coherent and non-coherent RRO is described below in conjunction with FIG. 5.

Figure 4:
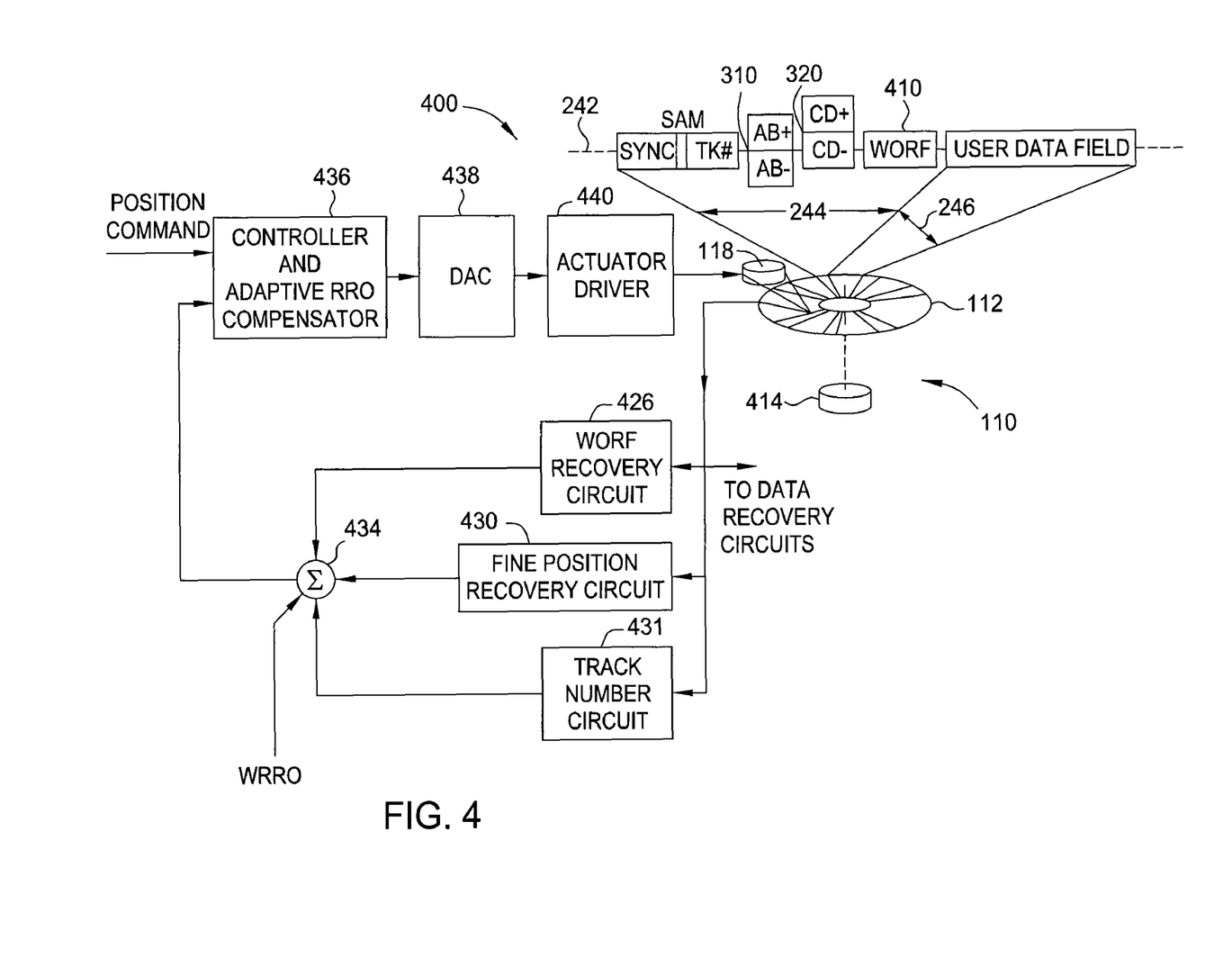
FIG. 4 is a schematic diagram of a servo system for determining the location of at least one servo burst edge in a servo wedge and producing a drive signal to an actuator driver of the disk drive, according to an embodiment of the invention.

FIG. 4 is a schematic diagram of a servo system 400 for determining the location of a servo burst edge in servo wedge 244 and producing a drive signal to an actuator driver 440 of disk drive 110, according to an embodiment of the invention. In this embodiment, storage disk 112 has a servo wedge 244 that includes a null type servo burst pattern that includes AB+, AB−burst edge 310 and CD+, CD−burst edge 320. The invention is equally applicable to disk drives that include other types of servo patterns, such as a quadrature servo pattern. Also included as part of the information contained in each servo wedge 244 is a WORF 410 for storing a correction value of the distance that AB+, AB−burst edge 310 and/or CD+, CD−burst edge 320 is from the desired track of a concentric data storage track 242, e.g., coherent RRO track 315 in FIG. 3. In some embodiments, the WORF value may also be stored in memory such as SRAM, DRAM, or flash. In an embodiment that features quadrature type servo pattern, the WORF value will correspond to a distance from at least one of AB burst edge 210 or CD burst edge 220 (shown in FIG. 2B). Storage disk 112 includes a plurality of concentric data storage tracks 242, each of which includes a plurality of servo wedges 244 and data fields 246.

The actuator arm assembly 118 is driven by an actuator driver 440. The actuator driver 440 delivers current to voice coil motor 128 shown in FIG. 1. In operation, minute electrical signals induced from recorded magnetic flux transitions are amplified by a preamplifier 424 and then delivered to conventional disk drive data recovery circuits (not shown). Disk drive 110 includes a servo system 400 that is used to determine the location of a transducer. The servo system 400 is a feedback loop that measures the position of transducer head 121 and produces a drive current that is input to the voice coil motor of actuator arm assembly 118 to drive and position transducer head 121 over a desired track. Servo system 400 includes a recovery WORF circuit 426, a fine position recovery circuit 430, and a track number circuit 431. A signal is produced by transducer head 121 and is processed by fine position recovery circuit 430 and track number circuit 431. The output signals of fine position recovery circuit 430 and track number circuit 431 are summed at a summing node 434 and corrected with at least one of the WORF values associated with AB+, AB−burst 310 and/or CD+, CD−burst value 320. The WORF value originates from WORF recovery circuit 426, which recovers a digital burst correction value, or WORF value, from the WORF field 410 in servo wedge 244 of the disk 112. In addition, the RRO is schematically shown to be added to the position signal at summing node 434, since that is the effect of RRO on the servo. In order to produce a drive current at the actuator driver 440, the controller circuit 436 receives the signal from summing node 434 and head position command values from other circuitry within the disk drive 110, and combines the command values with the quantized and corrected head position values to produce a commanded actuator current value. This commanded current value is calculated by controller circuit 436, converted into an analog value by a digital to analog converter 438, and applied to control an actuator driver circuit 440, which operates the rotary actuator 118 to adjust the position of the head relative to the concentric data storage track 242 being followed.

During normal operation of disk drive 110, an adaptive runout compensation algorithm may be used so that servo system 400 continually adapts to changes in RRO over time. DFT or table-based adaptive runout compensation algorithms may be used. Embodiments of the invention contemplate applying a modified version of such an adaptive runout compensation algorithm during the post-manufacturing self-test process for disk drive 110. The algorithm is modified to adapt only to the coherent RRO of a track during the process of computing WORF values for each concentric data storage track 242 of storage disk 112. Namely, the adaptive runout compensation algorithm is only permitted to adapt to the RRO of a given track for a limited number of revolutions, i.e., for a number of revolutions significantly lower than the number of revolutions required for the adaptive runout compensation algorithm to adapt to the RRO of a track during normal operation. Consequently, as the WORF value calculation process advances from one track to the next on storage disk 112, the adaptive runout compensation algorithm effectively adapts to the average runout of the two adjacent tracks, which is essentially the coherent RRO. Thus, transducer head 121 follows coherent RRO, e.g., coherent RRO track 315 in FIG. 3, during the WORF value calculation process, and any offset measured between transducer head 121 and a servo burst corresponds to non-coherent RRO, e.g., displacement 316.

Figure 5:
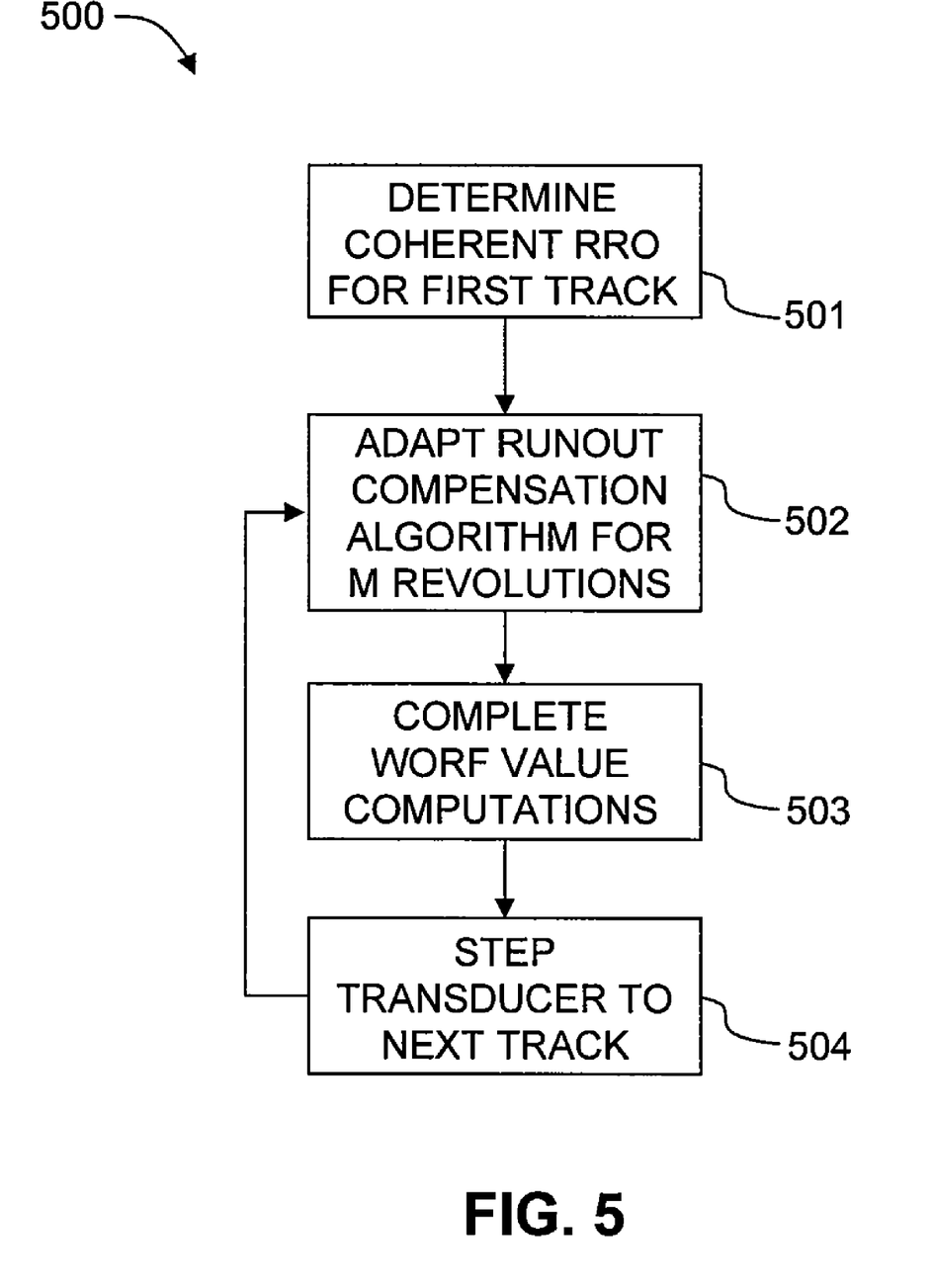
FIG. 5 is a flow chart summarizing a method of determining wedge offset reduction field (WORF) values in a disk drive, wherein non-coherent RRO is separated from coherent RRO using an adaptive runout compensation algorithm, according to an embodiment of the invention.

FIG. 5 is a flow chart summarizing a method 500 of determining WORF values in a disk drive, wherein non-coherent RRO is separated from coherent RRO using an adaptive runout compensation algorithm, according to an embodiment of the invention. For ease of description, method 500 is described in terms of a disk drive substantially similar to disk drive 110 in FIG. 1, however other disk drives may also benefit from the use of method 500. The commands for carrying out steps 501-504 may reside in the disk drive control algorithm and/or as values stored in the electronic circuits of the disk drive or on the storage disk itself.

In step 501, the coherent RRO is determined for the first data track to have its WORF values calculated. The first data track may be located at the outer diameter of storage disk 112 so that the WORF values for each track may be determined sequentially as transducer head 121 is stepped toward the inner diameter one track at a time. Alternatively, the first data track may be located at the inner diameter of storage disk 112 and transducer head 121 may be stepped toward the outer diameter one track at a time. The first data track may be located elsewhere on storage disk 112 as well.

In one embodiment, techniques commonly known in the art may be used to determine the coherent RRO for this first data track. For example, the average RRO may be measured by the drive for a plurality of tracks, e.g., on the order of 100 tracks, located near the first data track. This average RRO value may then be used as the coherent RRO for the first data track. Alternatively, other techniques known in the art to determine coherent RRO for the first data track may be employed.

In another embodiment, the adaptive runout compensation algorithm may be modified to determine the coherent RRO for the first data track. In such an embodiment, the disk drive 110 begins measuring RRO at a starting data track located N tracks from the first data track, where N is a whole number 2 to 5 times greater than the number of revolutions normally required by the adaptive runout compensation algorithm to completely adapt to the RRO of a particular data track. For example, if a particular adaptive runout compensation algorithm requires approximately 30 revolutions to fully adapt to the RRO of a particular data track, then N may be selected as 100. One of skill in the art can readily determine the value of N based on the characteristics of the adaptive runout compensation algorithm being used. By selecting N in this manner, the adaptive runout compensation algorithm can be assured of determining an accurate solution for the coherent RRO for the first data track. Disk drive 110 allows the adaptive runout compensation algorithm to learn and attempt to follow the RRO of the starting data track located N tracks from the first data track for M revolution. M is chosen to be significantly less than the adaptation time of the adaptive runout compensation algorithm. For example, if the adaptation time is 30 revolutions, M may be chosen as 1 or 2. Thus, the adaptive runout compensation algorithm partially adapts to the measured RRO. Disk drive 110 then steps transducer head 121 one data track closer to the first data track and measures the RRO for M revolutions of this data track located N−1 tracks from the first data track, thereby allowing the adaptive runout compensation algorithm to again partially adapt to the measured RRO. This process is repeated for all N data tracks, ending with measuring the RRO of the first data track for one revolution. At this point, the adaptive runout compensation algorithm is fully adapted to the coherent RRO of the N data tracks so measured, but has not significantly adapted to the non-coherent RRO of any one of the N tracks, since the algorithm is only given one revolution per track to adapt. An advantage to this embodiment is that no additional computational algorithm is required by disk drive 110 to determine the coherent RRO of the first data track, since a modified version of the adaptive runout compensation algorithm is used.

In step 502, disk drive 110 begins computing the WORF values for the current data track, which initially is the first data track described above in step 501. Techniques commonly known in the art may be used to compute WORF values for each servo wedge for the current data track, and such techniques require measuring the position error signal of each servo burst for multiple revolutions.

Concurrently, a modified adaptive runout compensation algorithm is employed so that servo system 400 positions transducer head 121 to follow the coherent RRO of the current data track, based on the estimate of coherent RRO determined in step 501. The adaptive runout compensation algorithm is modified to adapt to the RRO of the current data track for a limited number of revolutions, e.g., one or two, of storage disk 112. More particularly, the adaptive runout compensation algorithm is allowed to adapt to the RRO for a given track for M revolutions, where M is typically selected to be no more than about one tenth the number of revolutions necessary for the adaptive runout compensation algorithm to fully adapt to the RRO of a given track. For example, if the adaptation time is 30 revolutions, M may be chosen as 1 or 2. One of skill in the art can readily determine the value of M based on the characteristics of the adaptive runout compensation algorithm being used. By selecting M in this manner, the adaptive runout compensation algorithm adapts to the coherent RRO of adjacent tracks. Consequently, transducer head 121 follows the coherent RRO of the current track, and any offset measured between transducer head 121 and the position of servo bursts for the data track corresponds to non-coherent RRO. Thus, no additional calculations or computational algorithms are necessary to determine the non-coherent RRO on which the WORF values for the data track are based.

In one embodiment, the adaptation time of the adaptive runout compensation algorithm is also modified, i.e., either increased or decreased, to optimize adaptation to coherent RRO. For example, to reduce sensitivity to non-coherent RRO, the adaptation time of the adaptive runout compensation algorithm may be increased relative to the adaptation time of the unmodified adaptive runout compensation algorithm used during normal operation of disk drive 110.

In step 503, after M revolutions, the adaptive runout compensation algorithm is not allowed to adapt further to the RRO of the current data track, and instead continues to follow the coherent RRO path for the current data track, e.g., coherent RRO track 315 in FIG. 3. Disk drive 110 continues measuring the position error signal of each servo burst for one or more revolutions to complete the WORF value computation for the current data track and stores the final WORF values.

In step 504, disk drive 110 steps transducer head 121 to the next data track to undergo WORF value computation. The coherent RRO of the previous data track, measured in step 502, is used as the initial condition for the first revolution of the next data track. Steps 502-504 are then repeated until WORF values for all data tracks of storage disk 112 have been computed.

Compared to prior art methods of determining WORF values in a disk drive, method 500 has the significant advantage of measuring non-coherent RRO. Thus, no additional mathematical computations or extra storage is required to separate coherent and non-coherent RRO when computing WORF values for a data track.

Figure 6:
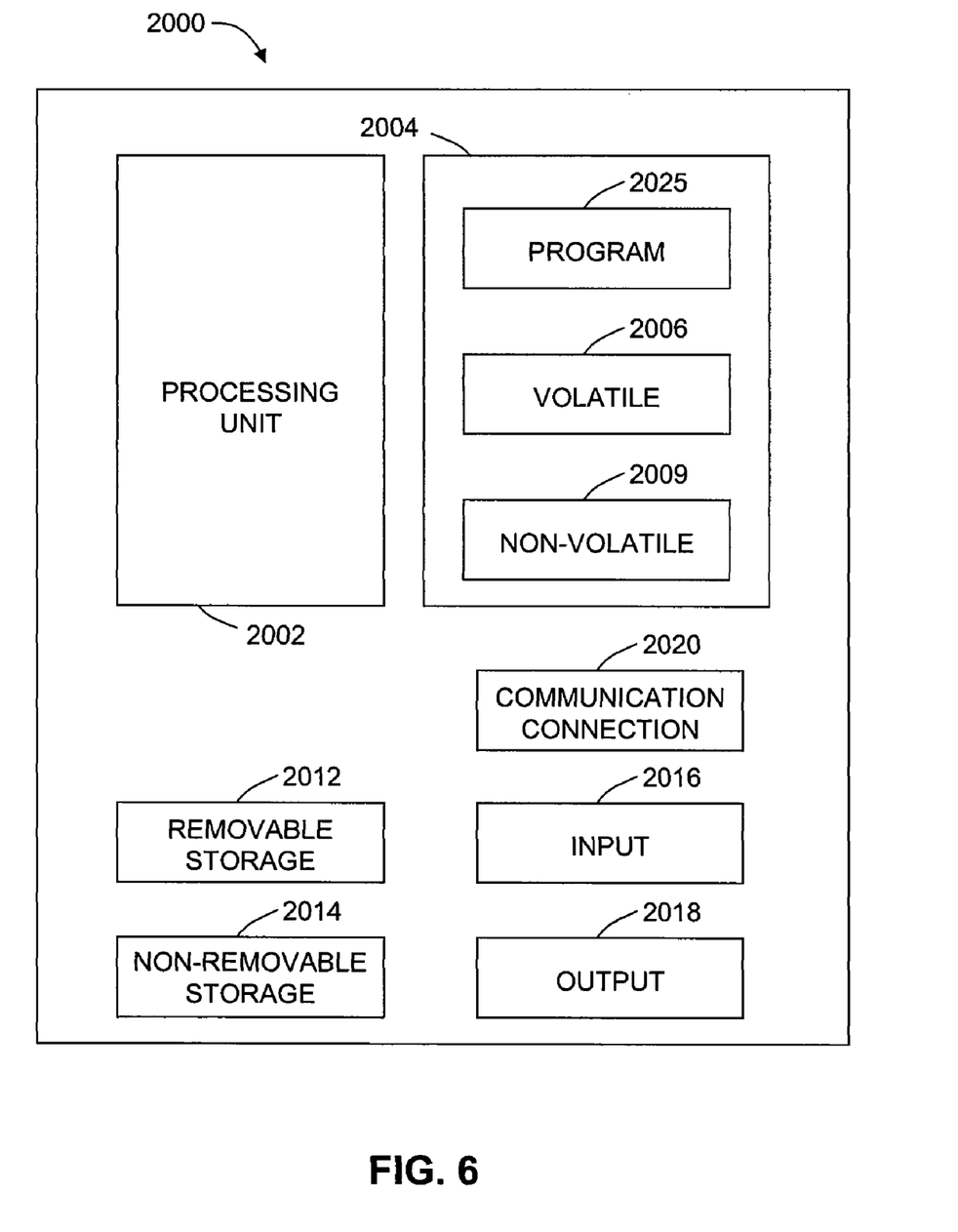
FIG. 6 is a block diagram of a computer system that executes computer program instructions for performing a method of directly measuring non-coherent RRO for each track of a disk drive, according to an embodiment of the invention.

FIG. 6 is a block diagram of a computer system 2000 that executes computer program instructions for performing a method of directly measuring non-coherent RRO for each track of a disk drive, according to an embodiment of the invention. Computer system 2000 includes a processing unit 2002, memory 2004, removable storage 2012, and non-removable storage 2014. Memory 2004 may include volatile memory 2006 and non-volatile memory 2008. Computer system 2000 may include, or have access to a computing environment that includes, a variety of computer-readable media, such as volatile memory 2006 and non-volatile memory 2008, removable storage 2012 and non-removable storage 2014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer system 2000 may include or have access to a computing environment that includes input 2016, output 2018, and a communication connection 2020. One of the inputs could be a keyboard, a mouse, or other selection device. The communication connection 2020 can also include a graphical user interface, such as a display. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable storage medium are executed by the processing unit 2002 of the computer system 2000. A hard drive, CD-ROM, and RAM are some examples of articles including a computer-storage readable medium. For example, a computer program 2025 capable of providing a generic technique to directly measure non-coherent RRO for each track of a disk drive, according to the teachings of the present invention, may be included on a CD-ROM and loaded from the CD-ROM to a hard drive. The computer-readable instructions allow computer system 2000 control a machine or system to directly measure non-coherent RRO for each track of a disk drive.

While the foregoing is directed to embodiments of the present invention, other and further embodiments of the invention may be devised without departing from the basic scope thereof, and the scope thereof is determined by the claims that follow.

I claim:

1. A method of determining correction factors for servo control of a transducer in a disk drive that has a recording medium configured with multiple tracks and a transducer head controlled with a servo control signal, the servo control signal being generated based on an adaptive runout compensation algorithm and correction factors, the method comprising the steps of:
  (a) successively positioning a transducer head over one or more tracks in a group and, for each track, allowing the adaptive runout compensation algorithm to adapt to a runout of said track for a first number of revolutions of the recording medium;
  (b) after step (a), stepping the transducer head to be moved over one track and allowing the adaptive runout compensation algorithm to adapt to a runout of said track for a second number of revolutions of the recording medium; and
  (c) after step (b), determining the correction factors, wherein said step (a) includes:
    designating one of the tracks in the group at an innermost diameter or outermost diameter of the group as an initial track;
    positioning the transducer head over a track in the group that is N tracks away from the initial track and waiting for the second number of revolutions of the recording medium; and
  successively repositioning the transducer head over an adjacent track in the group that is closer to said initial track and waiting for one revolution of the recording medium,
  wherein N is 2 to 5 times greater than the number of revolutions of the recording medium that is needed by the adaptive runout compensation algorithm to adapt to a particular track of the group and the second number of revolutions is at least 10 times smaller than the number of revolutions of the recording medium that is needed by the adaptive runout compensation algorithm to adapt to a particular track of the group.

* * * * *